(12) United States Patent
Hanes

(10) Patent No.: US 11,231,794 B2
(45) Date of Patent: Jan. 25, 2022

(54) MOUSEPADS WITH SENSORS

(71) Applicant: Hewlett-Packard Development Company, L.P., Spring, TX (US)

(72) Inventor: David H. Hanes, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/042,147

(22) PCT Filed: Sep. 12, 2018

(86) PCT No.: PCT/US2018/050561
§ 371 (c)(1),
(2) Date: Sep. 27, 2020

(87) PCT Pub. No.: WO2020/055388
PCT Pub. Date: Mar. 19, 2020

(65) Prior Publication Data
US 2021/0191534 A1 Jun. 24, 2021

(51) Int. Cl.
*G06F 3/039* (2013.01)
*G06F 3/03* (2006.01)
*G06F 3/147* (2006.01)

(52) U.S. Cl.
CPC .......... *G06F 3/0395* (2013.01); *G06F 3/0317* (2013.01); *G06F 3/147* (2013.01); *G06F 2203/0337* (2013.01); *G06F 2203/0384* (2013.01)

(58) Field of Classification Search
CPC .... G06F 3/0395; G06F 3/0393; G06F 3/0317; G06F 3/0346; G06F 3/0219; G06F 3/021; G06F 3/0213; G06F 2203/0381; G06F 3/03545; G06F 3/04883; G06F 3/0488; G06F 3/03547; G06F 3/041
See application file for complete search history.

(56) References Cited

U.S. PATENT DOCUMENTS

| | | | |
|---|---|---|---|
| 8,368,649 B2 | 2/2013 | Hall | |
| 8,570,273 B1* | 10/2013 | Smith | G06F 3/03547 345/156 |
| 9,513,726 B2 | 12/2016 | Tang | |
| 2003/0025678 A1* | 2/2003 | Lee | G09G 5/08 345/173 |
| 2007/0097078 A1 | 5/2007 | Chin | |
| 2007/0291007 A1* | 12/2007 | Forlines | G06F 3/0488 345/173 |

(Continued)

FOREIGN PATENT DOCUMENTS

| | | |
|---|---|---|
| AU | 2017101611 | 12/2017 |
| CN | 102693020 | 9/2012 |
| CN | 107506066 | 12/2017 |

*Primary Examiner* — Sanjiv D. Patel
(74) *Attorney, Agent, or Firm* — Fabian VanCott

(57) ABSTRACT

An input device that includes a mouse; a mousepad, that includes a sensor to detect a position of the mouse on a surface of the mousepad; a processor; an array of light-emitting diodes (LEDs) to, when activated by the processor, indicate a position of the mouse on the surface of the mousepad; wherein the mouse comprises a button that, when activated, causes the processor to initiate an action based on the detected position of the mouse relative to the surface of the mousepad.

20 Claims, 4 Drawing Sheets

(56) References Cited

U.S. PATENT DOCUMENTS

| | | | |
|---|---|---|---|
| 2008/0124509 A1* | 5/2008 | Boise | G06F 3/0395 |
| | | | 428/45 |
| 2009/0027341 A1 | 1/2009 | Arrigo et al. | |
| 2011/0234494 A1* | 9/2011 | Peterson | G06F 3/016 |
| | | | 345/161 |
| 2014/0152561 A1 | 6/2014 | Qian et al. | |
| 2015/0002399 A1* | 1/2015 | Tang | G06F 3/03543 |
| | | | 345/166 |
| 2016/0085322 A1 | 3/2016 | Park et al. | |

* cited by examiner

MOUSEPADS WITH SENSORS

BACKGROUND

Computing devices may include, as peripheral devices, a number of input devices. These input devices allow a user to interface with the computing device in order to cause computer readable program code to be executed by a processor of the computing device.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
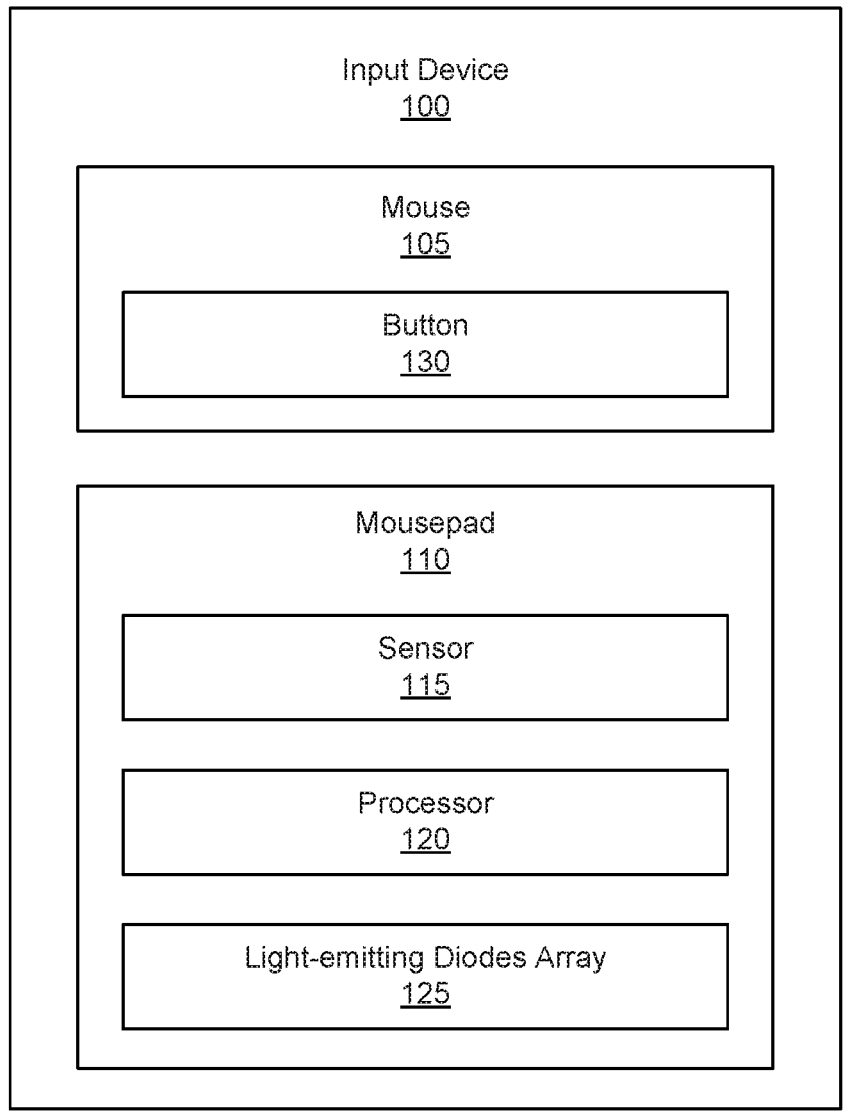
FIG. 1 is a block diagram of an input device according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Among a number of input devices associated with a computing device is a mouse. A mouse may include any hand manipulatable device that detects two-dimensional motion relative to a surface. In an example, the translation of the mouse over the two-dimensional surface may be digitally translated into movement of a cursor on a user interface such as a display screen on the computing device.

Movement of the mouse over the surface may allow a user to more easily interface with a computing device. The surface, however, is generally dumb in that there is no electrical connection between the mouse and the surface or the computing device and the surface. In some instances, the surface may include a mouse pad or other type of surface made to specifically serve as the 2D surface described herein. The present specification describes a wired and powered mousepad that, in connection with a mouse, provides additional functionality of the computing device as well as increase an aesthetic appeal of the mouse pad. In some examples presented herein, the additional functionality of the mousepad and mouse arise from the use of a sensor in the mousepad that detects the position of the mouse on the mousepad allowing for actuation of a button on the mouse to initiate execution of specific computer readable program code based on the position of the mouse on the mousepad at the time of the actuation. In an example, the aesthetic appeal of the mouse pad may be enhanced through the use of light-emitting diodes (LEDs) formed into the surface of the pad that light up based on the detected location of the mouse relative to the mousepad. In some examples, the color of the LEDs may be changed using any pattern and/or based on the type of application to be executed when the aforementioned button is pressed.

The present specification describes an input device that includes a mouse; a mousepad, that includes a sensor to detect a position of the mouse on a surface of the mousepad; a processor; an array of light-emitting diodes (LEDs) to, when activated by the processor, indicate a position of the mouse on the surface of the mousepad; wherein the mouse comprises a button that, when activated, causes the processor to initiate an action based on the detected position of the mouse relative to the surface of the mousepad.

The present specification also describes a method of interfacing with a computing device, including detecting, with a sensor in a mousepad, a position of a mouse on the mousepad to create mouse positional data; and with the mouse positional data: indicating a position of the mouse on the surface of the mousepad by illuminating an array of light-emitting diode (LEDs); and initiating, via a processor of the mousepad and upon receipt of a signal indicating a detection of a button press on the mouse, the execution of computer readable program code defining an application on a computing device.

The present specification describes a mousepad, that includes a processor; a sensor, to sense a location of a mouse on a surface of the mousepad; and an array of light-emitting diodes (LEDs) to indicate visually the position of the mouse on the mousepad wherein the processor receives input from the mouse to initiate the execution of computer readable program code defining an application on a computing device.

Turning now to the figures, FIG. 1 is a block diagram of an input device (100) according to an example of the principles described herein. The input device (100) may include a mouse (105) and a mousepad (110). The mouse (105) may be any type of mouse (105) and may include any number of buttons thereon to allow a user to send signals to a computing device during operation in order to make certain gestures such as selection of an object on an interface (i.e., display device), drag-and-drop of an object, and option selections, among other types of gestures.

As described herein, the mouse may include a dedicated button (130) that allows a user to, upon actuation of the button (130), conduct a gesture based on the location of the mouse (105) relative to the surface of the mousepad (110). The location of the mouse (105) relative to the surface of the mousepad (110) is determined at the time the button (130) is actuated by the user. In an example, the gesture conducted may include the execution of an application defined by computer readable program code. Consequently, during operation of the mouse (105) and mousepad (110), a user may translate the mouse (105) over the surface of the mousepad (110) to a predetermined location, actuate the button (130), and cause the computing device to execute the computer readable program code defining a certain application. This application may be predetermined by the computing device or may be customizable by the user prior to use of the mouse (105) and mousepad (110).

In order to determine the location of the mouse (105) relative to the surface of the mousepad (110), the mousepad (110) may include a sensor (115) communicatively coupled to a processor (120). In this example, the sensor (115) may be directed by the processor (120) to continuously detect the position of the mouse (105) relative to the mousepad (110).

The sensor (115) may be any type of sensor (115) that is capable of detecting the position of the mouse (105). In an example, the sensor (115) may include a plurality or array of sensors (115) placed within or about the entire surface of the mousepad (110). In an example, the sensor (115) may be a Hall effect sensor or an array of hall effect sensors distributed about the surface of the mousepad (110). In any example presented herein, the Hall effect sensors may detect a magnetic field created by a magnet placed within the housing of the mouse (105). As the magnetic field of the magnet in the mouse (105) comes close to the transducer of the Hall effect sensor, position of the mouse (105), the speed of the mouse (105), and/or the acceleration of the mouse (105) may be detected. Where an array of Hall effect sensors is used, triangulation of the magnet within the mouse (105) (and accordingly the mouse (105) itself) may be determined based on the relative output voltages received by the processor (120) from each of the Hall effect sensors. In an example, the magnet of the mouse (105) may add weight to the mouse (105) to provide a user with a customizable feel during use of the mouse (105).

Although the present specification describes the sensor (115) as being a Hall effect sensor, the present specification contemplates the use of any sensor that can determine the position of the mouse (105) over the surface of the mousepad (110). Examples include image, acoustic, chemical, electrical current, electrical potential, magnetic, radio, position, angle, displacement, distance, speed, acceleration, optical, light, force, thermal, and proximity sensors among others. In any of the examples presented herein, the mousepad (110) may receive information from the mouse (105), or may sense the presence and/or location of the mouse (105) without input from the mouse (105) itself. In the example where the mousepad (110) receives input (i.e., positional data of the mouse (105)) from the mouse (105), the mouse (105) may include its own sensors, processors, and wireless or wired communication device to communicate this positional data of the mouse (105) to the mousepad (110).

As the processor (120) of the mousepad (110) receives data describing the position of the mouse (105) relative to the surface of the mousepad (110), the mousepad (110) may provide the data to a processor of a computing device. In this example, the mousepad (110) may be communicatively coupled to the computing device via a wireless or wired connection. Examples of wireless connections may include near-field communication, Wi-Fi communication, Bluetooth, and radio communication among others. In the example where the mousepad (110) is communicatively coupled to the computing device via a wired interface, that interface may include a universal serial bus (USB) connection. However, with the wired connection, a USB port on the computing device may be used thereby preventing the use of other USB communication devices with the computing device.

In the examples where either of the mouse (105) or mousepad (110) are implemented as wireless communication devices to communicate with each other, a battery may be implemented. In this example, the batteries may provide power their respective wireless communication hardware devices as well as to the sensors (115) described herein.

The mousepad (110) may include a light-emitting diode (LED) array (125). The LED array (125) may be spread over the surface of the mousepad (110) so as to provide light emitted from the LED array (125) to be viewable by a user.

The LED array (125) may provide any color and or pattern of illumination of the individual LEDs of the LED array (125). Although specific patterns and/or colors presented by the LED array (125) may be described herein, the present specification contemplates the use of any pattern and/or color presented by the LED array (125). In an example, the movement of the mouse (105) across the surface of the mousepad (110) as detected by the sensor (115) may adjust the illumination of the LED array (125). Examples of patterns may include illuminating those LEDs within the LED array (125) that define an outline of the mouse (105) on the mousepad (110). Consequently, the processor (120) of the mousepad (110) may further use the data related to the position of the mouse (105) on the surface of the mousepad (110) may be used to determine the pattern, color, and positions of the patterns and colors presented by the LED array (125). In an example, the LED array (125) may indicate the position of the mouse (105) on the surface of the mousepad (110) by changing the color of the LEDs based on the position of the mouse on the surface of the mousepad; changing the luminosity of the LEDs based on the position of the mouse on the surface of the mousepad; changing the strobe rate of the LEDs based on the position of the mouse on the surface of the mousepad; illuminating the LEDs around a physical border of the mouse; or combinations thereof.

In an example, a computing device associated with the mouse (105) and mousepad (110) may include a display device. The computing device may execute computer readable program code and present graphical user interfaces on the display device. The user interfaces may present to the user a number of customization selections regarding the mouse (105) and/or mousepad (110).

A customization associated with mouse (105) may include the customization of the application or type of application to be opened when the button (130) on the mouse is pressed. As described herein, the button (130), when activated, causes the processor (120) to initiate an action based on the detected position of the mouse (105) relative to the surface of the mousepad (110). In this example, the action is the execution of an application or type of application. In an example, the mousepad (110) may be virtually separated into sections such that, upon actuation of the button (130) by the user, the section in which the mouse (105) is detected to be in may determine the application that is to be opened. Thus, the user interface may indicate graphically to a user the sections the mousepad (110) has been virtually separated into and allow the user to change or otherwise customize the application or type of application to be opened when the actuation of the button (130) occurs within any section of the mousepad (110). In an example, the LED array (125) may also be customized to allow the user to visually, during operation, discern which of the virtual sections of the mousepad (110) the mouse (105) is currently within. As such, part of the customization by the user may also or alternatively include changing the color, luminosity, and/or strobe rate of any one of the LEDs within the LED array (125).

By way of example, a user may be presented with the graphical user interface and allowed to select that, for example, in an upper-right section of the mousepad (110) a word processing application is to be executed upon actuation of the button (130) within that section. Additionally, the user may select that blue LEDs within the LED array (125) will be illuminated in a strobing fashion when the mouse (105) is translated into the real section of the mousepad (110) represented by the virtual section of the mousepad (110) presented to the user on the graphical user interface. Thus, whenever the user translates the mouse (105) across the surface of the mousepad (110) and towards the upper-right section of the mousepad (110), the LED array (125) may cause all or some of the blue LEDs to illuminate in a strobing fashion. This may visually indicate to the user that the mouse (105) has been detected by the sensor (115) to be within the upper-right section of the mousepad (110). The user may then actuate the button (130) in order to open the word processing application as assigned by the user previously.

As described herein, the mouse (105) and/or mousepad (110) may each have a dedicated processor in order to send and/or receive signals and process data received from any sensor (115). Additionally, the computing device associated with the mouse (105) and mousepad (110) may include its own processor. Each of these processors may send data to and receive data from each other. Each of these processors may, therefore, include hardware architecture to retrieve executable code from a data storage device and execute that executable code. The executable code may, when executed by any of processors, cause the processor to implement at least the functionality of the methods of the present specification described herein. In the course of executing code, any of the processors may receive input from and provide output to a number of the remaining hardware units.

Figure 2:
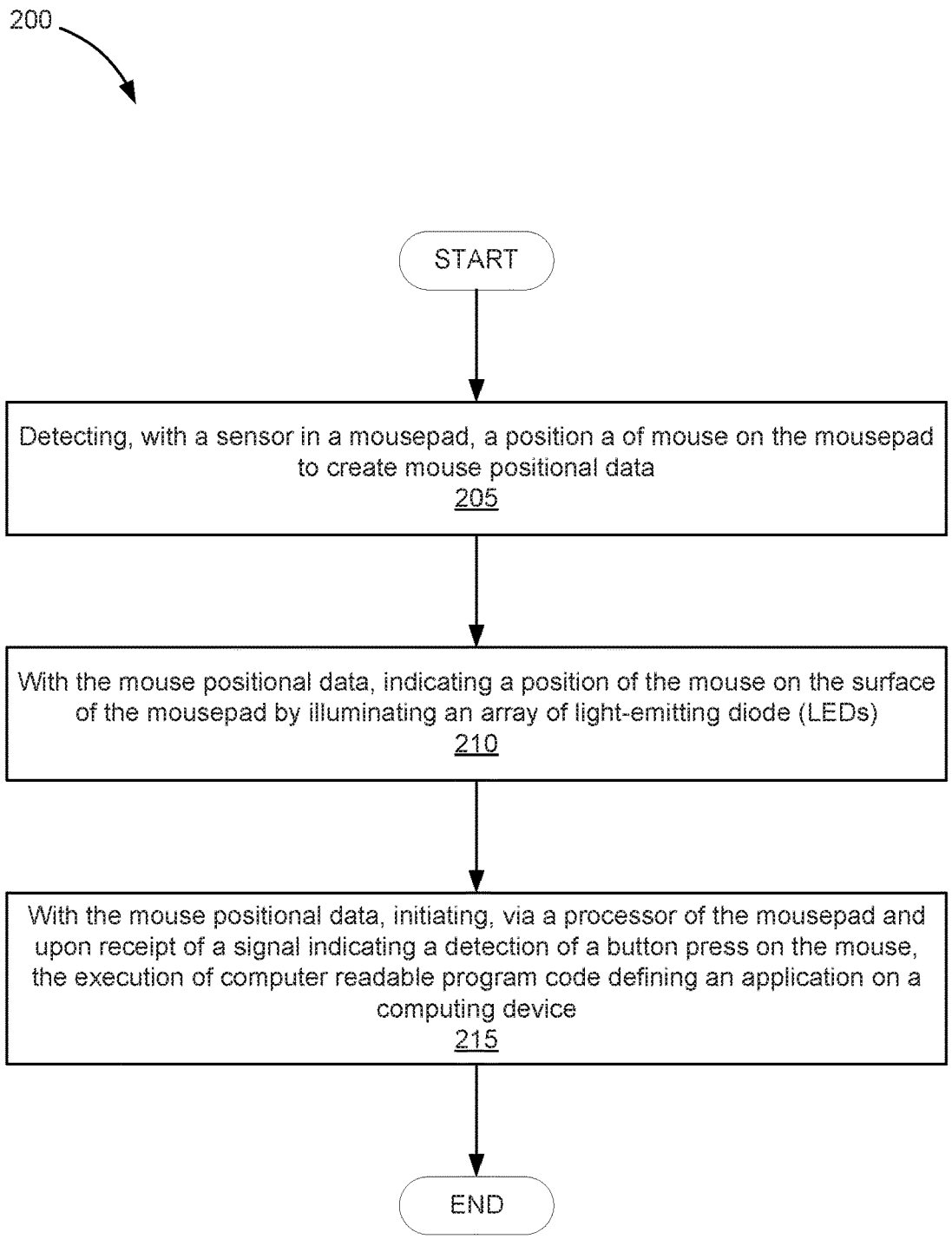
FIG. 2 is a flowchart showing a method of interfacing with a computing device according to an example of the principles described herein.

FIG. 2 is a flowchart showing a method (200) of interfacing with a computing device according to an example of the principles described herein. The method (200) may start with detecting (205), with a sensor in a mousepad, a position of a mouse (FIG. 1, 105) on the mousepad (FIG. 1, 110) to create mouse positional data. As described herein, any type of sensor (FIG. 1, 115), such as a Hall effect sensor, may be used to detect (205) the position of the mouse (FIG. 1, 105) over the surface of the mousepad (FIG. 1, 110). In an example, a data storage device associated with the mousepad (FIG. 1, 110) may maintain the created mouse positional data after the position of the mouse (FIG. 1, 105) has been detected (205). In an example, the mousepad (FIG. 1, 110) may transmit, at any time, the mouse positional data to a processor of the computing device used with the mousepad (FIG. 1, 110) and mouse (FIG. 1, 105).

With the mouse positional data obtained, the method (200) may continue with indicating (210) a position of the mouse (FIG. 1, 105) on the surface of the mousepad (FIG. 1, 110) by illuminating an array of light-emitting diodes (LEDs) (FIG. 1, 125) formed on and/or within the mousepad (FIG. 1, 110). As described herein, the array of LEDs indicates (210) the position of the mouse on the surface of the mousepad (FIG. 1, 110) by changing the color of the LEDs based on the position of the mouse on the surface of the mousepad; changing the luminosity of the LEDs based on the position of the mouse on the surface of the mousepad; changing the strobe rate of the LEDs based on the position of the mouse on the surface of the mousepad; illuminating the LEDs around a physical border of the mouse; or combinations thereof. The present specification, however, contemplates the activation or illumination of any of the LEDs within the LED array (FIG. 1, 125) based on the position of the mouse on the surface of the mousepad.

The method (200) may further include, with the mouse (FIG. 1, 105) positional data, initiating (215), via a processor (FIG. 1, 120) of the mousepad (FIG. 1, 110) and upon receipt of a signal indicating a detection of a button (FIG. 1, 130) press on the mouse (FIG. 1, 105), the execution of computer readable program code defining an application on a computing device. In this example, a processor (FIG. 1, 120) of the mousepad (FIG. 1, 110) may provide a signal to a processor of an associated computing device about the detection of the actuation of the button (FIG. 1, 130) on the mouse (FIG. 1, 105) indicating the positional data. In an example, the mousepad (FIG. 1, 110) may provide additional data associated with the mouse positional data such as a specific application to be executed may be sent by the processor (FIG. 1, 120) of the mousepad (FIG. 1, 110) to the processor of the computing device. In an example, the processor (FIG. 1, 120) of the mousepad (FIG. 1, 110) may send the signal wirelessly to the processor of the computing device. In an example, the processor (FIG. 1, 120) of the mousepad (FIG. 1, 110) may send the signal over a wired connection to the processor of the computing device.

Figure 3:
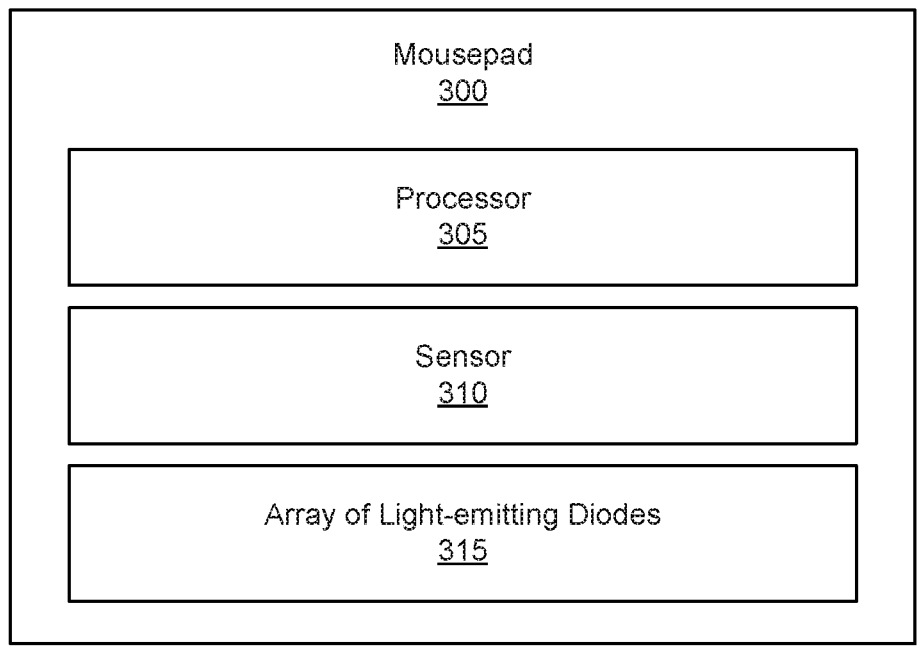
FIG. 3 is a block diagram of a mousepad according to an example of the principles described herein.

FIG. 3 is a block diagram of a mousepad (300) according to an example of the principles described herein. The mousepad (300) may include a processor (305) to receive a number of signals from a sensor (310). The mousepad (300) may further include an array of light-emitting diodes (LEDs) (315). Based upon the signals received from the sensor (310), the array of LEDs (315) may be illuminated as described herein.

The sensor (310) may be any type of sensor that can sense the location of a mouse (FIG. 1, 105) on a surface of the mousepad (300). In an example, the sensor may be a Hall effect sensor. In this example, the Hall effect sensor may sense a change in a magnetic field from the mouse (FIG. 1, 105) or a magnet placed with the mouse (FIG. 1, 105). In an example, the sensor (310) may be an array of sensors distributed throughout the surface of the mousepad (300). In this example, the array of sensors (310) may be cooperative sensors the cooperate to determine the position of the mouse (FIG. 1, 105) relative to the mousepad (300). Here, the array of sensors (310) may be used to triangulate the position of the mouse (FIG. 1, 105) relative to the surface of the mousepad (300). In an example, the array of sensors (310) may be non-cooperative and instead may confirm the output of one sensor (310) to another. Here, the processor (305) of the mousepad (300) may receive independent data from each of the sensors (310) in the array of sensors (310) to create a consensus of the position of the mouse (FIG. 1, 105) relative to the surface of the mousepad (300).

As described herein, the array of LEDs (315) may present visual aesthetics as well as confirmation to the user during operation of the mousepad (300). The aesthetics presented by the array of LEDs (315) to the user may be customizable via a graphical user interface presented to a user on a display device of a computing device. The processor of the computing device may relay the customization properties of the illumination of the array of LEDs (315) to the mousepad (300) and stored in a data storage device associated with the mousepad (300). During operation of the mousepad (300), a dedicated processor of the mousepad (300) may execute computer readable program code descriptive of the illumination characteristics of the array of LEDs (315) based on the customization properties.

Figure 4:
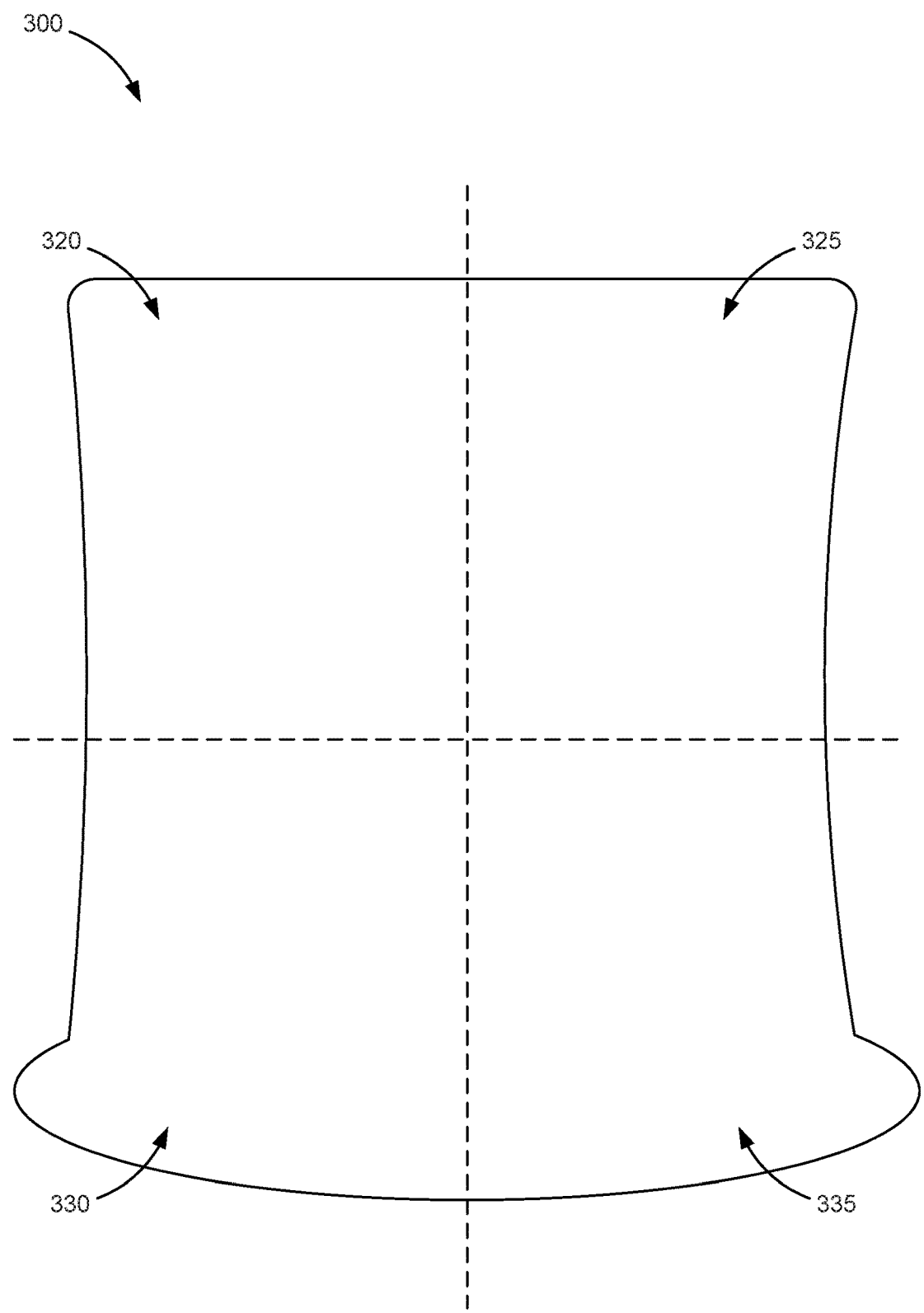
FIG. 4 is a top view of a mousepad of FIG. 3 according to an example of the principles described herein.

FIG. 4 is a top view of a mousepad (300) of FIG. 3 according to an example of the principles described herein. As described herein, the mousepad (300) may be virtually separated into a plurality of sections (320, 325, 330, 335). In the example shown in FIG. 4, the mousepad (300) is divided into 4 individual sections (320, 325, 330, 335): a first upper-left section (320), a second upper-right section (325), a third lower-left section (330), and a lower-right section (335). Although FIG. 4 shows the four sections (320, 325, 330, 335), the number of sections (320, 325, 330, 335) may be more or less than four and the present specification contemplates the virtual division of the mousepad (300) in any form or manner.

The mousepad (300) may be separated into any number of virtual sections (320, 325, 330, 335) to which the mousepad (300) and a processor of an associated computing device maintains. As described herein, each virtual section (320, 325, 330, 335) of the mousepad (300) may be assigned a certain application, or function to be executed upon detection by the mousepad (300) of the actuation of the button (FIG. 1, 130) on the mouse (FIG. 1, 105) as described herein. Additionally, each section (320, 325, 330, 335) or a combination of the sections (320, 325, 330, 335) may be associated with a certain illumination pattern of the array of LEDs (315) (not shown) embedded into or placed on the surface of the mousepad (300).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (305) of the mousepad (300) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a mousepad that receives, via a number of sensors, data describing the position of a mouse relative to the surface of the mousepad. With this data, the aesthetics of the mousepad as well as the functional abilities of the mouse and mousepad may be enhanced. The aesthetic changes in the LED array described herein provide, in an example, locational data of the mouse relative to the mousepad to the user during operation. Additionally, upon detection of actuation of the button on the mouse, certain gestures may be engaged on a computing device include execution of computer readable program code descriptive of an application. In certain examples, both the application (or type of application) as well as the illumination of the array of LEDs may be customized by the user extending the personalization and functionality of the mousepad.

The preceding description has been presented to illustrate and describe examples of the principles described. This description is not intended to be exhaustive or to limit these principles to any precise form disclosed. Many modifications and variations are possible in light of the above teaching.

What is claimed is:

1. An input device, comprising:
a mouse;
a mousepad, comprising:
a sensor to detect a position of the mouse on a surface of the mousepad;
a processor;
an array of light-emitting diodes (LEDs) to, when activated by the processor, indicate a position of the mouse on the surface of the mousepad;
wherein the mouse comprises a button that, when activated, causes the processor to initiate an action based on the detected position of the mouse relative to the surface of the mousepad.

2. The input device of claim 1, where in the sensor is a hall effect sensor.

3. The input device of claim 2, where the mouse comprises a magnet to interact with the hall effect sensor.

4. The input device of claim 1, wherein the LEDs indicate the position of the mouse on the surface of the mousepad includes:
changing the color of the LEDs based on the position of the mouse on the surface of the mousepad;
changing the luminosity of the LEDs based on the position of the mouse on the surface of the mousepad;
changing the strobe rate of the LEDs based on the position of the mouse on the surface of the mousepad;
illuminating the LEDs around a physical border of the mouse; or
combinations thereof.

5. The input device of claim 1, the mousepad comprising a USB plug to interface with a computing device.

6. The input device of claim 1, the mousepad comprising a wireless communication adapter to wirelessly communicate with a computing device.

7. A method of interfacing with a computing device, comprising:
detecting, with a sensor in a mousepad, a position a of mouse on the mousepad to create mouse positional data; and
with the mouse positional data:
indicating a position of the mouse on the surface of the mousepad by illuminating an array of light-emitting diode (LEDs); and
initiating, via a processor of the mousepad and upon receipt of a signal indicating a detection of a button press on the mouse, the execution of computer readable program code defining an application on a computing device.

8. The method of claim 7, where in the sensor is a hall effect sensor.

9. The method of claim 7, wherein the button press on the mouse originates from a button dedicated to the execution of computer readable program code.

10. The method of claim 7, wherein the array of LEDs indicates the position of the mouse on a surface of the mousepad by:
changing the color of the LEDs based on the position of the mouse on the surface of the mousepad;
changing the luminosity of the LEDs based on the position of the mouse on the surface of the mousepad;
changing the strobe rate of the LEDs based on the position of the mouse on the surface of the mousepad;
illuminating the LEDs around a physical border of the mouse; or
combinations thereof.

11. The method of claim 7, wherein initiating, via a processor of the mousepad, the execution of computer readable program code defining an application on a computing device comprises sending a signal to the computing device from the processor to the computing device via a wired connection between the mousepad and the computing device.

12. The method of claim 7, wherein initiating, via a processor of the mousepad, the execution of computer readable program code defining an application on a computing device comprises sending a signal to the computing device from the processor to the computing device via a wireless connection between the mousepad and the computing device.

13. A mousepad, comprising:
a processor;

a sensor, to sense a location of a mouse on a surface of the mousepad; and an array of light-emitting diodes (LEDs) to indicate visually the position of the mouse on the mousepad;

wherein the processor receives input from the mouse to initiate the execution of computer readable program code defining an application on a computing device.

14. The mousepad of claim 13, wherein the processor sends, via a wired connection to the computing device, a signal to the computing device to initiate the execution of computer readable program code defining the application.

15. The mousepad of claim 13, wherein the processor sends, via a wireless connection to the computing device, a signal to the computing device to initiate the execution of computer readable program code defining the application.

16. The input device of claim 1, wherein the mouse comprises an additional dedicated button that, when actuated, invokes a different function dependent on where the mouse is on the mousepad.

17. The input device of claim 16, further comprising user input that customizes what function is invoked by the dedicated button when the mouse is in a corresponding location on the mousepad.

18. The input device of claim 1, wherein the LEDs are spread over the surface of the mousepad.

19. The method of claim 7, wherein indicating the position of the mouse of the surface of the mousepad with the array of LEDs further comprises illuminating LEDs within the LED array that define an outline of the mouse on the mousepad.

20. The method of claim 7, wherein indicating the position of the mouse of the surface of the mousepad with the array of LEDs further comprises indicating which of multiple portions of the mousepad contain the mouse, with each of the multiple portions corresponding to a different function that will be invoked when a dedicated button on the mouse is actuated while the mouse is in that portion of the mousepad.

* * * * *